United States Patent
Krishnamurthy et al.

(10) Patent No.: US 10,515,400 B2
(45) Date of Patent: Dec. 24, 2019

(54) LEARNING VECTOR-SPACE REPRESENTATIONS OF ITEMS FOR RECOMMENDATIONS USING WORD EMBEDDING MODELS

(71) Applicant: Adobe Inc., San Jose, CA (US)

(72) Inventors: Balaji Krishnamurthy, Noida (IN); Raghavender Goel, New Delhi (IN); Nikaash Puri, New Delhi (IN)

(73) Assignee: Adobe Inc., San Jose, CA (US)

( * ) Notice: Subject to any disclaimer, the term of this patent is extended or adjusted under 35 U.S.C. 154(b) by 538 days.

(21) Appl. No.: 15/259,832

(22) Filed: Sep. 8, 2016

(65) Prior Publication Data
US 2018/0068371 A1    Mar. 8, 2018

(51) Int. Cl.
| G06Q 30/00 | (2012.01) |
| G06F 17/30 | (2006.01) |
| G06Q 30/06 | (2012.01) |
| G06F 17/27 | (2006.01) |
| G06N 3/04 | (2006.01) |
| G06N 5/04 | (2006.01) |
| G06N 3/08 | (2006.01) |

(52) U.S. Cl.
CPC ....... G06Q 30/0631 (2013.01); G06F 17/276 (2013.01); G06N 3/0427 (2013.01); G06N 3/08 (2013.01); G06N 5/041 (2013.01)

(58) Field of Classification Search
CPC .................................................. G06Q 30/0631
See application file for complete search history.

(56) References Cited

U.S. PATENT DOCUMENTS

| 9,535,897 | B2* | 1/2017 | Anderson | G06F 16/951 |
| 2007/0226207 | A1* | 9/2007 | Tawde | G06F 16/355 |
| 2013/0139191 | A1* | 5/2013 | Ren | H04N 21/2541 |
|  |  |  |  | 725/1 |
| 2017/0024645 | A1* | 1/2017 | Socher | G06N 3/08 |
| 2019/0114687 | A1 | 4/2019 | Krishnamurthy et al. |  |

OTHER PUBLICATIONS

Microsoft corporation; patent application titled "feature embedding in matrix factorization" published online. (Jul. 17, 2014,). Politics & Government Week Retrieved from https://search.proquest.com/docview/1544153146?accountid=14753.*

Collobert,"A unified architecture for natural language processing: Deep neural networks with multitask learning", Proceedings of the 25th international conference on Machine learning. ACM, 2008., Jul. 2008, 8 pages.

Harper,"The MovieLens Datasets: History and Context", ACM Transactions on Interactive Intelligent Systems (TiiS) 5, 4, Article 19, Dec. 2015, 20 pages.

(Continued)

*Primary Examiner* — Kathleen Palavecino
(74) *Attorney, Agent, or Firm* — SBMC

(57) ABSTRACT

Learning vector-space representations of items for recommendations using word embedding models is described. In one or more embodiments, a word embedding model is used to produce item vector representations of items based on considering items interacted with as words and items interacted with during sessions as sentences. The item vectors are used to produce item recommendations similar to currently or recently viewed items.

20 Claims, 7 Drawing Sheets

(56) References Cited

OTHER PUBLICATIONS

Koren, "Matrix factorization techniques for recommender systems", In IEEE journal of Computer vol. 42, issue 8, Aug. 2009, pp. 42-49.

Mikolov, "Efficient estimation of word representations in vector space", arXiv preprint arXiv:1301.3781 (2013), Sep. 7, 2013, 12 pages.

Mnih, "A Scalable Hierarchical Distributed Language Model", Advances in neural information processing systems. 2009., 2009, 8 pages.

Pennington, "GloVe: Global Vectors for Word Representation", EMNLP. vol. 14. 2014., Sep. 2014, 12 pages.

Sarwar, "Item-Based Collaborative Filtering Recommendation Algorithms", In Proceedings of WWW10, Available at <http://citeseerx.ist.psu.edu/viewdoc/download;jsessionid=53CDC5DC7FF8F88183770CD0C72DD017?doi=10.1.1.167.7612&rep=rep1&type=pdf>, 2001, 11 pages.

Zhou, "Large-scale Parallel Collaborative Filtering for the Netflix Prize", Algorithmic Aspects in Information and Management, Jun. 2008, 12 pages.

Juan, "Field-aware Factorization Machines for CTR Prediction", Proceedings of the 10th ACM Conference on Recommender Systems, Sep. 2016, 8 pages.

Krishnamurthy, "Learning Vector-Space Representations of Items for Recommendations using Word Embedding Models", Procedia Computer Science 80 (2016), Jun. 2016, 6 pages.

"Combined Search and Examination Report", GB Application No. 1810574.2, dated Dec. 11, 2018, 7 pages.

"Non-Final Office Action", U.S. Appl. No. 15/785,934, dated Oct. 30, 2019, 12 pages.

Linden, "Amazon.com Recommendations Item-to-Item Collaborative Filtering", Published by the IEEE Computer Society, Feb. 2003, pp. 76-80.

\* cited by examiner

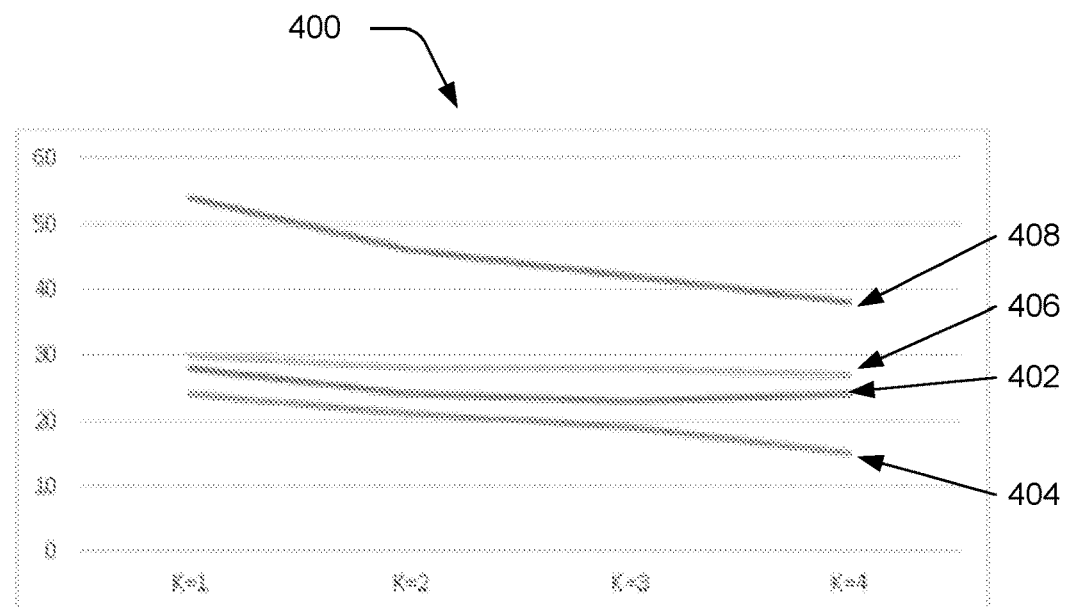
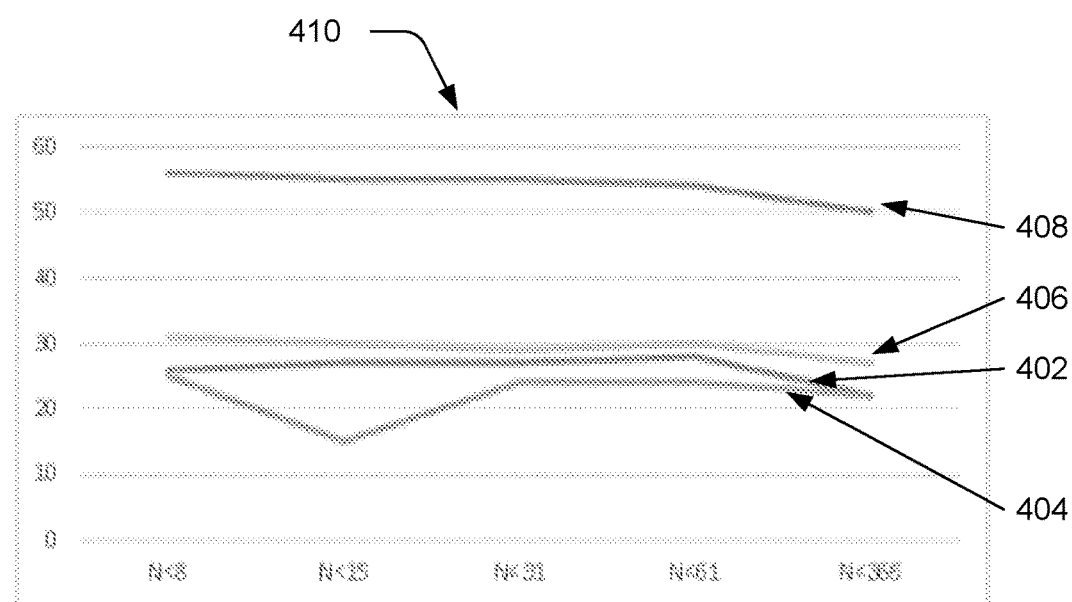
Fig. 4

500

```
┌─────────────────────────────────────┐
│ Receive data that describes         │
│ interaction of users with items.    │
│ 502                                 │
└─────────────────────────────────────┘
                  │
                  ▼
┌─────────────────────────────────────┐
│ For each session, consider          │
│ individual items interacted with as │
│ words and a string of words         │
│ corresponding to items interacted   │
│ with during the session as a        │
│ sentence.                           │
│ 504                                 │
└─────────────────────────────────────┘
                  │
                  ▼
┌─────────────────────────────────────┐
│ Determine item vector               │
│ representations for the items based │
│ on the sentences.                   │
│ 506                                 │
└─────────────────────────────────────┘
                  │
                  ▼
┌─────────────────────────────────────┐
│ Build an item similarity matrix     │
│ based on the determined product     │
│ vector representations.             │
│ 508                                 │
└─────────────────────────────────────┘
```

*Fig. 5*

LEARNING VECTOR-SPACE REPRESENTATIONS OF ITEMS FOR RECOMMENDATIONS USING WORD EMBEDDING MODELS

BACKGROUND

Recommendations of products or services are used by computing devices to expose users to items with which the user may not be aware but may have a potential interest. For example, recommendations involving products may be provided by computing devices to a user of a shopping service system or recommendations of movies may be provided to a user of an online streaming service system, and so on. Recommendations have become one of the major drivers as part of a decision making process by users to interact with digital content and even in some places has supplanted search in locating products or services of interest.

Conventional recommendations are generated by computing devices through use of models built from data that describes past interactions of users with items. The models are used by the computing devices along with information regarding current interactions with items to provide recommendations based on these interactions. For example, for a user that is currently viewing a dryer, a dryer vent hose recommendation may be provided by the computing devices to the user.

Conventional models used by computing devices to provide recommendations are built based on previous user interactions. These user interactions may involve items that were viewed together, which are known as item view-view relationships. These user interactions may also involve items that were viewed and ultimately bought, which are known as item view-bought relationships. Another example of user interactions involve items that were bought together, which are known as item bought-bought relationships. Models built using these relationships are often referred to as co-occurrence models. A drawback of these types of models, however, is that the models are unable to distinguish why interaction occurred between two items. Consequently, convention techniques that rely on these models may be inaccurate. For example, if a power cord is popular with users it may be provided as a recommendation in conventional techniques, not because the power cord is similar to viewed items, but because it is a popular item. Accordingly, conventional techniques used by computing devices may fail to provide useful item recommendations due to a failure by the computing devices to address relationships involving similarities between items.

SUMMARY

Learning vector-space representations of items by at least one computing device for recommendations using word embedding models is described. In one or more embodiments, a digital medium environment including the at least one computing device is configured to collect historical data for items of products or services (also referred to simply as "items" in the following) and users who have interacted with the respective items. The historical data describes the interactions in terms of respective sessions of the users involving a plurality of interactions, e.g., browsing sessions.

The items are considered as words by the at least one computing device, and items interacted with collectively during respective sessions are considered by the at least one computing device as sentences having the words. The sentences are then input into a word embedding model by the at least one computing device that determines vector representations for the items based on the inputted sentences. The similarity between two given items is a function of their respective vector representations. These similarities are computed by the at least one computing device and used to build an item similarity matrix. The item similarity matrix is a data structure that captures similarities between the various items interacted with by the users. The item similarity matrix is then used by the at least one computing device to provide item recommendations to users by determining similar items to newly interacted with items.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

FIG. 4 depicts charts detailing performance in accordance with one or more embodiments.

FIG. 5 is a flow diagram depicting an example procedure in accordance with one or more embodiments.

DETAILED DESCRIPTION

Overview

Figure 1:
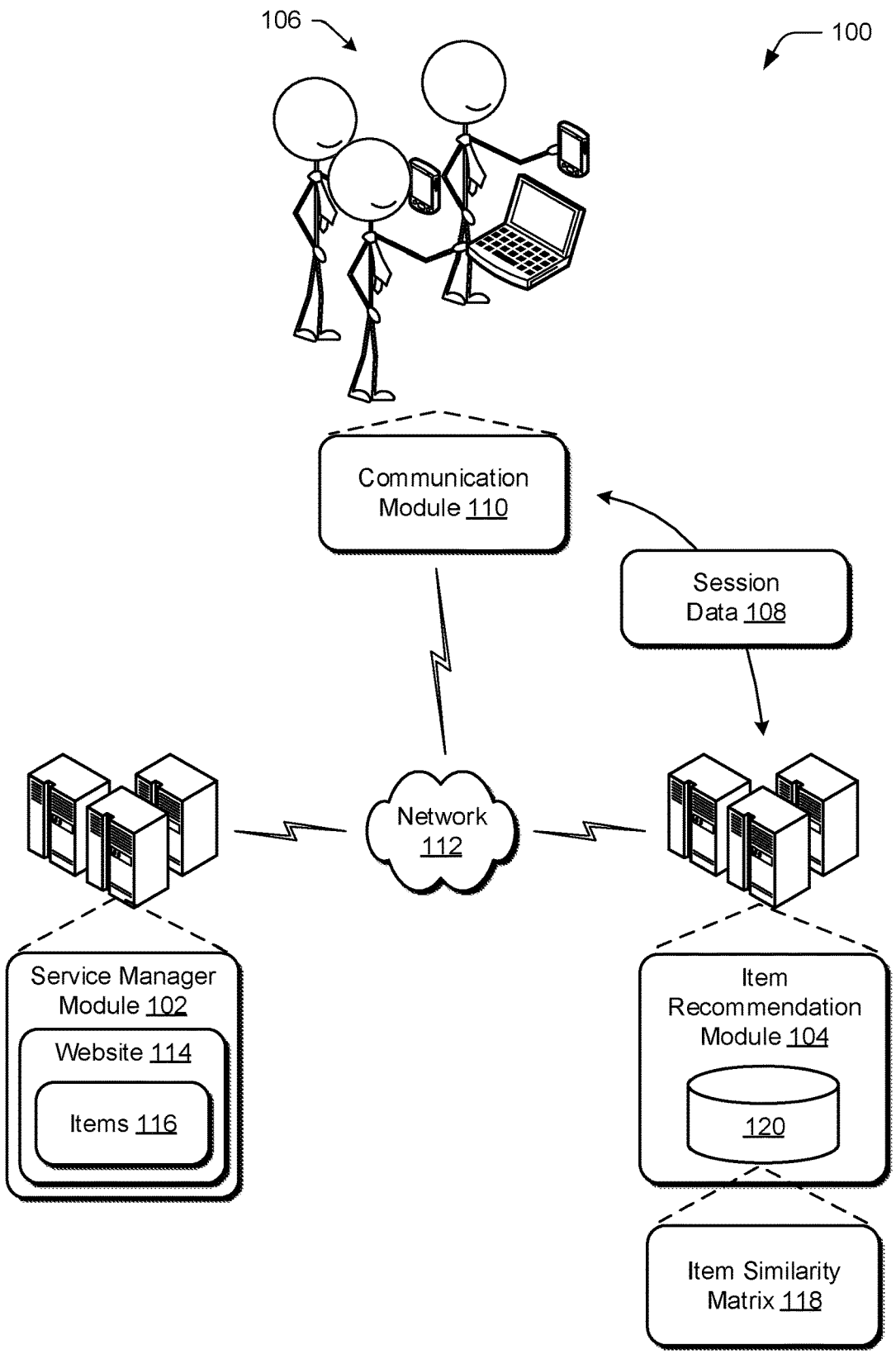
FIG. 1 is an illustration of an environment in an example embodiment that is operable to employ techniques described herein.

Techniques and systems are described that utilize word embedding models by at least one computing device to determine vector space representations of items and use the vector space representations to determine item similarities for recommendations. Past user interaction data is used by the at least one computing device through use of the word embedding model to determine the vector representations for the items. For example, one user may have interacted with items "a," "b," and "c" together and another user may have interacted with items "b," "c," and "d" together. The interactions are organized by the at least one computing device into sessions, that is, a group of items interacted with together in a particular time frame by a respective user. Examples of sessions include a single login session, browsing session, time period without inactivity, and so on. In the above example, the sessions are classified as session "a b c" and session "b c d."

The word embedding model is used by the at least one computing device to determine vector representations for the items based on the interaction data. In order to do so, the at least one computing device considers items (e.g., representations of products or services) with which interaction occurred as words and sessions as sentences formed from these words. A word representative of an item may be a single word for the item name, a concatenated item name, an item number for the item, or any other single string of letters without a space. For the example above, the sentences that are input into the word embedding model by the at least one computing device may look like "a b c" from the first user and "b c d" from the second user. So, this example includes two sentences corresponding to two user sessions. Using the sentences, the at least one computing device employs the word embedding model to learn item vector representations of the items. By using a word embedding model with words and sentences, vector representations are created, that when compared, one to another, are able to signify meaningful relationships between the items. This is because word embedding models are designed to be able to determine meaningful relationships between words through vector representations of the words. The item vector representations are then used by the at least one computing device to build an item similarity matrix that is able to define relationships between items. In order to build the item similarity matrix, dot products between the resultant item vector representations are compared, one to another, by the at least one computing device. The higher the dot product, the more similar the two items are and vice versa. The item similarity matrix can then be used by the at least one computing device to find similar items to what a user has interacted with and used by the at least one computing device to provide accurate item recommendations for the user.

By using the word embedding model to form the item similarity matrix, the system is able to address item-to-item causation, which is not possible with conventional techniques. The increase in recommendation accuracy may result in recommending items of greater significance to a user, which can lead to increased sales, a better user experience, and so on. A variety of other examples are also contemplated as further described below.

An example environment is first described that may employ the item recommendation techniques described herein. Example procedures are then described which may be performed in the example environment as well as other environments. Consequently, performance of the example procedures is not limited to the example environment and the example environment is not limited to performance of the example procedures.

In one or more embodiments, the term "word embedding model," as used herein, may refer to any mathematical model that is usable by a computing device to determine vector representations of words from input sentences. Examples of word embedding models are the Global Vectors for word representation model and the Word2Vec model.

In one or more embodiments, the term "item vector representation," as used herein, may refer to any representation of an item (e.g., good or service) in vector space determined by inputting sentences derived from browsing session items into a word embedding model. Comparisons of item vector representations of items are able to produce item similarities.

In one or more embodiments, the term "item similarity matrix," as used herein, may refer to a database structure that captures item to item similarities.

In one or more embodiments, the term "session," as used herein, may refer to an amount of time to determine respective items viewed by individual users to input as a sentence into the word embedding model. Examples of sessions are a time period without 30 minutes of inactivity for a shopping environment, a time period without 12 hours of inactivity for a streaming environment, a session involving continuous interaction with a particular service provider (e.g., web service), and so forth.

Example Environment

FIG. 1 depicts an environment, generally at 100, in an example embodiment that is operable to employ item recommendation techniques using vector-space representations of items using word embedding models described herein. The illustrated environment 100 includes a service manager module 102, item recommendation module 104, and user interaction with respective computing devices 106, also referred to herein as users, as a source of session data 108 communicated through communication module 110. Thus, modules 102, 104, and 110 are implemented at least partially in hardware of one or more respective computing devices and may reside on computer-readable storage media to be executed by respective processing systems. Examples of processing systems and computer-readable media can be found in the discussion of the example computing system of FIG. 7. Computing devices that implement these entities are communicatively coupled, one to another, via a network 112. Computing devices that are usable to implement the service manager module 102, support interaction with the users 106, and implement the item recommendation module 104 may be configured in a variety of ways such as hardware, software, or a combination thereof.

A computing device, for instance, may be configured as a desktop computer, a laptop computer, a mobile device, and so forth. Thus, the computing device may range from full resource devices with substantial memory and processor resources (e.g., personal computers, game consoles) to a low-resource device with limited memory and/or processing resources (e.g., mobile devices). Additionally, a computing device may be representative of a plurality of different devices, such as multiple servers utilized by a business to perform operations "over the cloud" as further described in relation to FIG. 7.

The service manager module 102 is representative of functionality implemented at least partially in hardware of a computing device to provide services accessible via network 112 that are usable to make products or services available to the users 106 via respective computing devices. The service manager module 102, for instance, may expose a website 114 or other functionality that is accessible via the network 112 by the users 106 to view or purchase items 116 corresponding to products or services. The users 106 may utilize the communication module 110 to access the service manager module 102 through a browser, network-enabled application, and so on of a respective computing device that obtains data from the service manager module 102 via the network 112. This data is employed by the users 106 through the communication module 110 to communicate with the service manager module 102 to obtain information about the products or services as well as purchase the products or services.

In order to promote the products or services, the service manager module 102 may employ an item recommendation module 104 that is implemented at least partially in hardware of at least one computing device. Although functionality of the item recommendation module 104 is illustrated as separate from the service manager module 102, this functionality may also be incorporated as part of the service manager module 102, further divided among other entities, and so forth. The item recommendation module 104 is representative of functionality implemented at least partially in hardware to provide item recommendations to the users 106. In order to provide item recommendations, the item recommendation module 104 may utilize an item similarity matrix 118 that may be stored on storage 120, e.g., a computer-readable storage medium as further described in relation to FIG. 7. The item similarity matrix 118 is a data structure that is able to capture item to item similarities for use in generating the item recommendations.

In order to build the item similarity matrix 118, the item recommendation module 104 collects session data 108 from the users 106 through communication module 110. Session data 108 comprises information regarding which of the users interacted with which of the items 116 during respective sessions. As discussed above, a session refers to an amount of time for a user involving interaction with the service manager module 102 without a period of inactivity, e.g., over a defined amount of time such as five seconds, one minute, and so forth. An example of a session may be a period of time viewing one or more items 116 comprising a period of time without 30 minutes of inactivity on the website 114 or application. The items 116 (e.g., data representative of products or services) viewed during the respective sessions are input into the item recommendation module 104 in order to build the item similarity matrix 118 in data stored in storage 120. Further description of the item recommendation module 104 is included in the following and shown in a corresponding figure.

Thus, modules 102 and 104, user interaction with respective computing devices 106, along with the storage 120, are implemented at least partially in hardware of one or more respective computing devices and may reside on computer-readable storage media to be executed by respective processing systems. Examples of processing systems and computer-readable media can be found in the discussion of the example computing system of FIG. 7.

Figure 2:
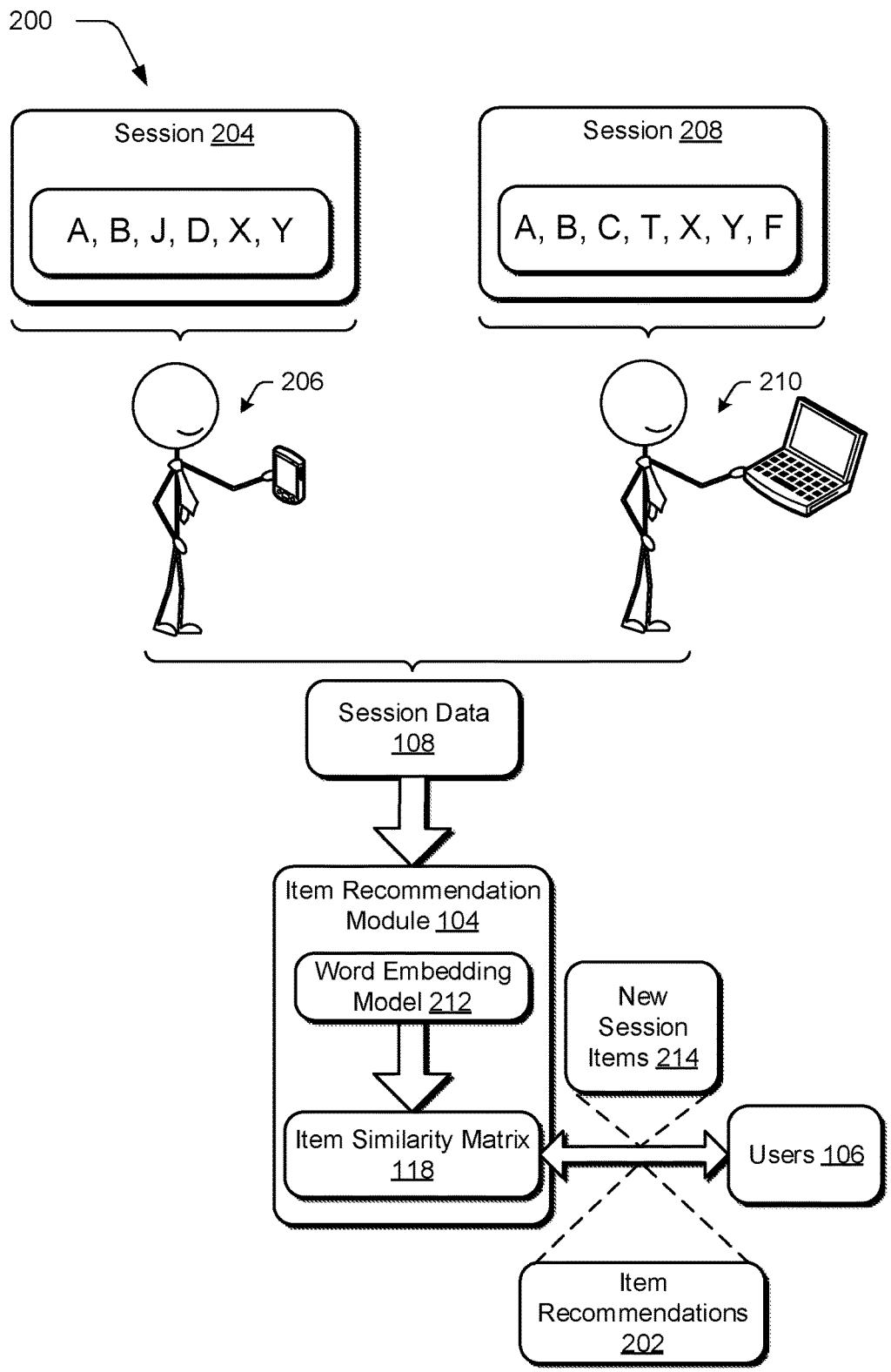
FIG. 2 illustrates portions of the environment from FIG. 1 in greater detail in accordance with one or more embodiments.

FIG. 2 depicts a system, generally at 200, in an example embodiment showing operation of the item recommendation module 104 of FIG. 1 in greater detail as processing session data 108 to build item similarity matrix 118 and provide item recommendations 202 to users using the item similarity matrix 118. Session data 108 is received by the item recommendation module 104 from computing devices of the users 106. As discussed above, session data 108 describes interactions of users 106 with items 116 during respective sessions. Example sessions are shown as session 204 by user 206 and session 208 by user 210. Letters displayed inside the respective sessions are indicative of items interacted with during the sessions. For example, session 206 involved user 206 interacting with items "A," "B," "J," "D," "X," and "Y" Although sessions 204 and 208 are shown as being relative to two users: 206 and 210, sessions 204, 208 may originate from the same user. That is that a single user may have a plurality of sessions with respective item interactions that may be used by the item recommendation module 104 to build the item similarity matrix 118.

In order to build the item similarity matrix 118, the item recommendation module 104 inputs the session data 108 into a word embedding model 212. The word embedding model 212 is maintained as data to produce item vector representations for the items 116 that are in turn used by the item recommendation module 104 to create the item similarity matrix 118. This may be performed through comparisons of dot products of the item vector representations of the items, performing arithmetic on the item vector representations, and so on. The word embedding model 212 may be configured in a variety of ways, examples of which include a Global Vectors for word representation model, a Word2Vec model, or any other suitable word embedding model able to create vector representations of words. Further discussion of operation of the word embedding model 212 and the building of the item similarity matrix 118 are described below in relation to FIG. 3.

Continuing with the item recommendation module 104 of FIG. 2, the item similarity matrix 118 is used to provide item recommendations 202 to users 106 based on new session items 214 by respective users 106. New session items 214 are indicative of items interacted with during current sessions by users 106. That is, if a user is currently viewing or has recently viewed (within the time frame of a session) item "A," the item recommendation module 104 may provide item recommendations 202 to the user by examining the item similarity matrix 118 for items similar to item "A." If there are no similar items within the item similarity matrix 118, then the item recommendation module 104 may not provide an item recommendation, provide a generic item recommendation, and so on. Oppositely, if the item recommendation module 104 determines a multitude of similar items to previously viewed items, a weighting function may be used by the item recommendation module 104 to assign a higher weight to recommendations similar to more recently viewed items. Other factors such as item ratings, item tags, and so on may also be used by the item recommendation module 104 to rank the item recommendations for presentation to the user.

Figure 3:
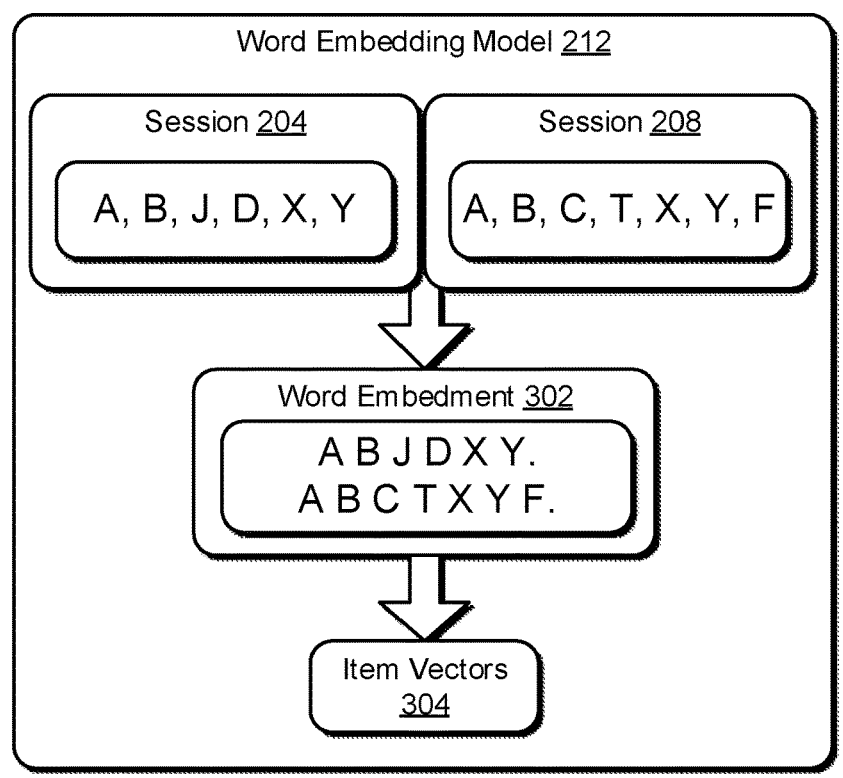
FIG. 3 illustrates portions of the environment from FIG. 2 in greater detail in accordance with one or more embodiments.

FIG. 3 depicts a system, generally at 300, in an example embodiment showing operation of the word embedding model 212 of FIG. 2 in greater detail as processing session data 108 to produce item vector representations of the interacted with items, shown as item vectors 304. Examples of session data 108 are illustrated same as FIG. 2 shown as sessions 204 and 208. As discussed above, session 204 comprises interactions with items "A," "B," "J," "D," "X," and "Y" Session 208 comprises user interactions with items "A," "B," "C," "T," "X," "Y" and "F." Again, sessions may be from the same or different users. The interacted with items during respective sessions are used by the word embedding model 212 to create a word embedment 302. The word embedment 302 is indicative of considering the items viewed during sessions as words and strings of items viewed during respective sessions as sentences. Following the example sessions 204 and 208, the word embedment 302 for sessions 204 and 208 includes "A B J D X Y. A B C T X Y F." The word embedding model 212 is able to use the word embedment 302 to calculate item vectors 304 for each of the items of the sessions.

Any suitable word embedding model 212, such as the GloVe (Global Vectors for word representation) model or the Word2Vec models, may be used to calculate the item vectors 304 for the items in the sessions from the word embedment 302. The GloVe and Word2Vec models are described in detail below. Depending on the word embedding model 212 used, multiple permutations of sentences may be used as the word embedment 302 and input into the word embedding model 212.

Word Embedding Models

GloVe is a global log-bilinear regression model that is configured to use a word-word co-occurrence matrix along with local context window methods to generate word embeddings in a low dimensional space. As discussed above, embedding of words is used by the computing device to produce item vector representations of the associated items. The item vectors are usable by an item recommendation system of a computing device to create an item similarity matrix through comparison of the item vectors, arithmetic that is based on the item vectors, and so on. Although GloVe is described in terms of using a word-word co-occurrence matrix where items are considered as words and items in sessions as sentences, an item-item co-occurrence matrix can also be used to generate item embeddings in the low dimensional space directly. For example, the GloVe model is able to make use of a conventional item-item co-occurrence matrix to produce more accurate item-item similarities through vector representation without necessarily converting items and sessions to words and sentences. The GloVe model has several advantages that make it suitable for the task of creating item vector representations. One such advantage is that the GloVe model efficiently leverages statistical information by training only on the nonzero elements in an item-item co-occurrence matrix, rather than on the entire sparse matrix or on individual context windows in a large corpus. Further, the representation deduction process in GloVe treats the distance between words to determine their relative similarity. Intuitively, this makes sense since items that are interacted with consecutively in a session are likely to be more similar than items that are separated by a larger number of items within a session. For example, consider items interacted with during two session streams. The first session comprising items I1, I2, I3, and I4 and the other comprising items I5, I6, I4, I1, and I7. By observing the two sessions it may be deduced that I2 and I3 are more similar than I5 and I7. This kind of relationship is captured by the GloVe word embedding model.

Word2Vec consists of two distinct models (CBOW and skip-gram), each of which defines two training methods (with/without negative sampling) and other variations, such as hierarchical softmax. Both CBOW and skip-gram are shallow 2-layer neural network models. The CBOW model is used for item recommendations since it more intuitively captures the problem domain.

In a typical CBOW embodiment the neural network is trained to predict the central word given the words that occur in a context window around it. The word representations are learned in such a way that a sequence of the words (or items) in the embedment may have an effect on performance. However, for item recommendations it is beneficial to learn word embeddings in an order agnostic manner. In order to make the model less sensitive to these orderings, the Word2Vec model includes a number of random permutations of the items in a user session to the training corpus.

Recommendation System Evaluation

To evaluate different item recommendation models, a sample data set regarding movie views by users is used. The dataset comprises 10 million ratings and 100 thousand tag applications applied to 10 thousand movies by 72 thousand users. In order to evaluate performance, a recall@20 measure is used. For each user, the last movie that the user has seen is removed. The set (of size K) of previously seen movies is then used to predict 20 movies that the model believes the user is most likely to watch. If the removed movie is present in the list of 20 recommended movies the prediction is counted as a success, else a failure. The metric is then simply the total percentage of successes over all users. The recall@20 measure is a realistic metric for comparing recommendation models as it captures user behavior in an explicit manner.

FIG. 4 depicts, generally at 400 and 410, the results of the recall@20 measure (percentage of recommendation success) for four recommendation models in accordance with one or more embodiments. Graph 400 shows the four recommendation model performances with four different K values. The four models are a conventional item-item co-occurrence model 402, the Word2Vec word embedding model without word permutations 404, the Word2Vec word embedding model with word permutations 406, and the GloVe word embedding model 408. Again, K is the number of previous movies (other than the removed one) used to make the recommendations. As seen in graph 400, the GloVe 408 and Word2Vec with word permutations 406 outperform the conventional co-occurrence model 402 for all values of K. As K increases, the success rate decreases for all models. This suggests that the most recent item that a user has been exposed to is the most important item for recommendation purposes.

Graph 410 shows performances of the four recommendation models for varying values defining a difference in time between the last removed movie and the watched movies. The time period is shown on the "x-axis" as "N." Again the GloVe 408 and Word2Vec with word permutations 406 outperform the conventional co-occurrence model 402 for all values of N. As N increases the accuracy for all of the models decreases slightly. This suggests that if the time difference between the removed movie and the previous K movies is very large, the pervious K movies will have lesser impact on the users' decisions choosing the removed movie. For example, a movie that a user watched a year ago is unlikely to influence the user's current intent in selecting a movie.

Example Procedures

The following discussion describes item recommendation techniques using word embedding models that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-4.

FIG. 5 depicts, generally at 500, a procedure in an example embodiment in which a digital medium environment is configured to build an item similarity matrix by using a word embedding model. To begin, data is received by at least one computing device that describes interaction of a plurality of users with a plurality of items of products or services (block 502). The data is organized by the at least one computing device into sessions comprising groups of items interacted with by respective users in a time frame. An example session is a user interacting with items "A," "B," "C," "X," and "D."

Then, for each session of the data, the at least one computing device consider items interacted with as words and a string of the items interacted with during the session as a sentence (block 504). For the above example session, the sentence would look like "A B C X D." The sentences from block 504 are then inputted into a word embedding model by the at least one computing device that is able to produce item vector representations for the items (block 506). Examples word embedding models that are able to produce vector representations are the GloVe and Word2Vec models.

Finally, an item similarity matrix is built by the at least one computing device based upon the item vector representations of the items (block 508). For example, dot products of the item vectors may be computed to determine similar items. As discussed above, the higher the value of the dot product between two item vectors, the more similar the two items are to each other.

Figure 6:
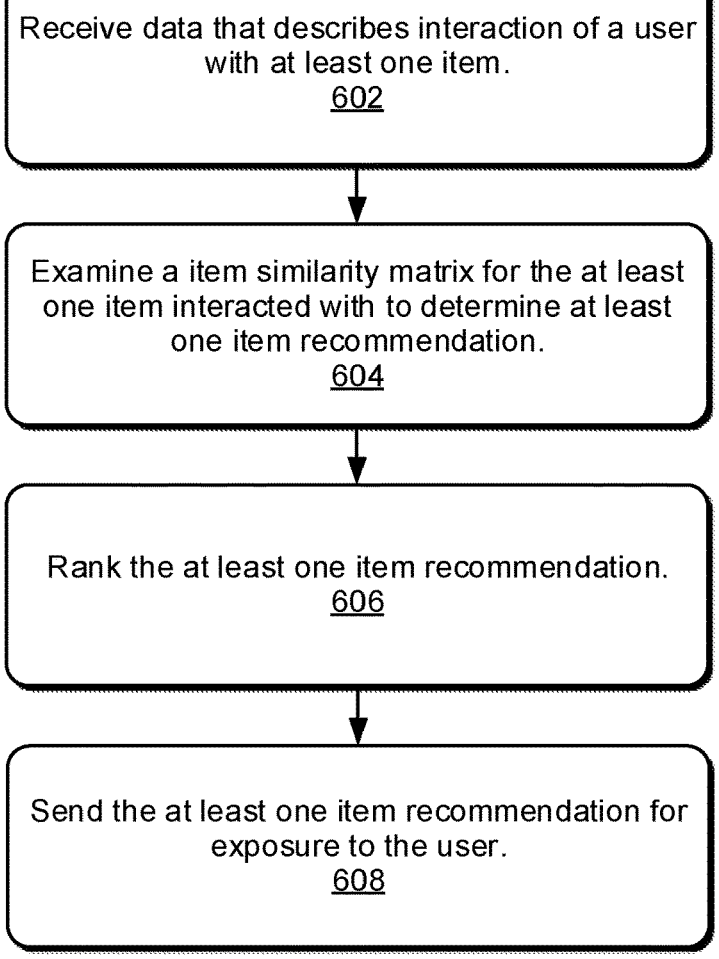
FIG. 6 is a flow diagram depicting an example procedure in accordance with one or more embodiments.

FIG. 6 depicts, generally at 600, a procedure in an example embodiment in which a digital medium environment is configured to use an item similarity matrix to determine similar items. To begin, data is received by at least one computing device that describes interaction of a user with at least one item (block 602). The item may be currently interacted with or recently interacted with.

Then, an item similarity matrix is examined by the at least one computing device using the at least one interacted with item to determine at least one product recommendation that is similar to the at least one interacted with item (block 604). The item similarity matrix may be built using the procedure from FIG. 5.

Next, if more than one item is recommended, the recommended items are ranked by the at least one computing device (block 606). The rankings may be determined based upon times at which the interactions occurred (recommendations for more recently interacted with items may be ranked higher) or based upon explicit item ratings by users.

Finally, the at least one item recommendation is sent by the at least one computing device for exposure to the user (block 608). A variety of other examples are also contemplated as described above.

Example System and Device

Figure 7:
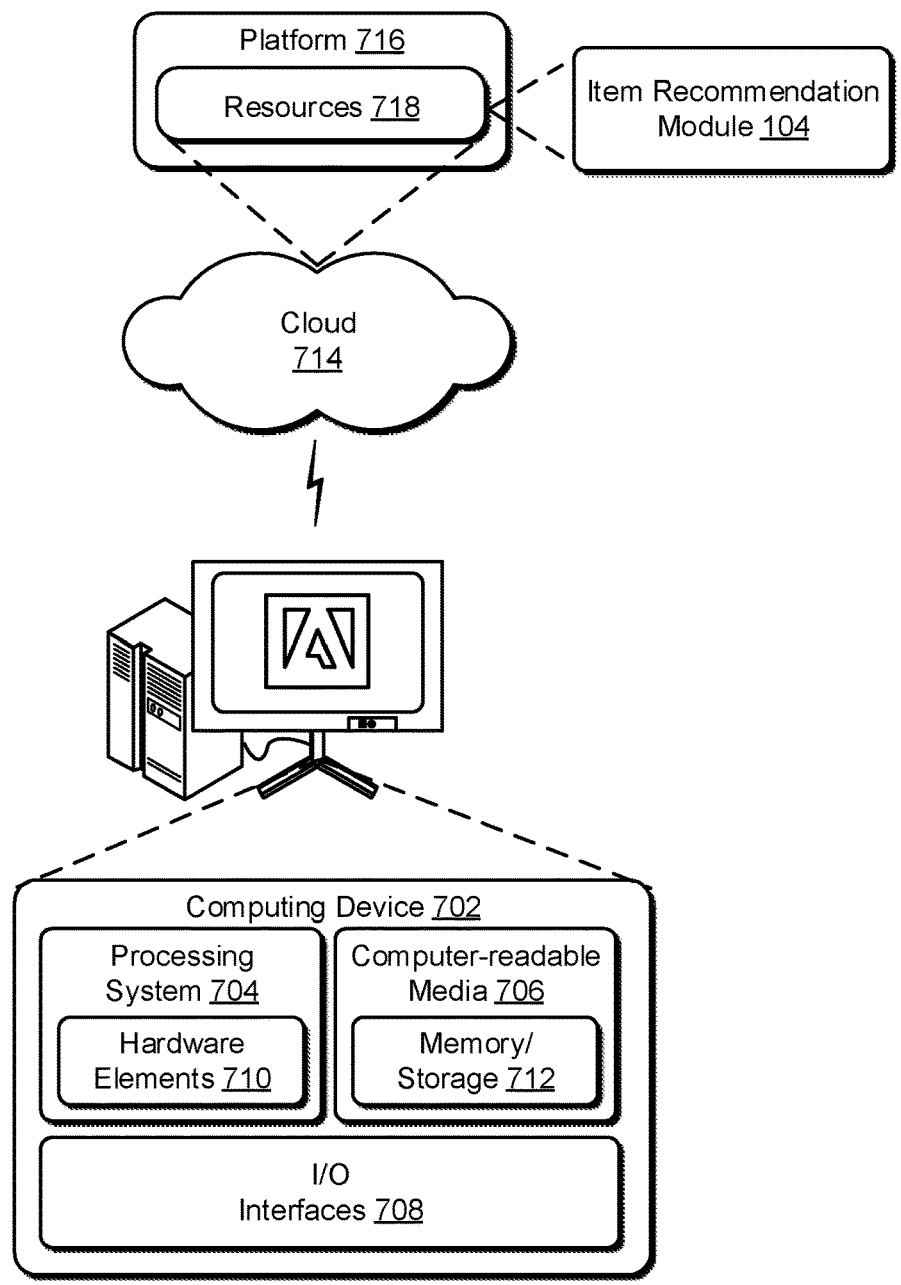
FIG. 7 is an illustration of an environment in an example embodiment that is operable to employ techniques described herein.

FIG. 7 depicts, generally at 700, an example embodiment showing an example computing device 702 that is representative of one or more computing systems and/or devices that may implement the various techniques described herein. This is illustrated through inclusion of the item recommendation module 104, which may be configured to attribute contributions to campaigns in achieving an action or conversion. The computing device 702 may be, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interface 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware element 710 that may be configured as processors, functional blocks, and so forth. This may include embodiment in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 706 is illustrated as including memory/storage 712. The memory/storage 712 represents memory/storage capacity associated with one or more computer-readable media. The memory/storage component 712 may include volatile media (such as random access memory (RAM)) and/or nonvolatile media (such as read only memory (ROM), Flash memory, optical disks, magnetic disks, and so forth). The memory/storage component 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An embodiment of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other embodiments in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, embodiment of a module that is executable by the computing device 702 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 and/or processing systems 704) to implement techniques, modules, and examples described herein.

The techniques described herein may be supported by various configurations of the computing device 702 and are not limited to the specific examples of the techniques described herein. This functionality may also be implemented all or in part through use of a distributed system, such as over a "cloud" 714 via a platform 716 as described below.

The cloud 714 includes and/or is representative of a platform 716 for resources 718. The platform 716 abstracts underlying functionality of hardware (e.g., servers) and software resources of the cloud 714. The resources 718 may include applications and/or data that can be utilized while computer processing is executed on servers that are remote from the computing device 702. Resources 718 can also include services provided over the Internet and/or through a subscriber network, such as a cellular or Wi-Fi network.

The platform 716 may abstract resources and functions to connect the computing device 702 with other computing devices. The platform 716 may also serve to abstract scaling of resources to provide a corresponding level of scale to encountered demand for the resources 718 that are implemented via the platform 716. Accordingly, in an interconnected device embodiment, embodiment of functionality described herein may be distributed throughout the system 700. For example, the functionality may be implemented in part on the computing device 702 as well as via the platform 716 that abstracts the functionality of the cloud 714.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to provide recommendations of items of products or services, a method implemented by at least one computing device, the method comprising:
    collecting, by the at least one computing device, data that describes interaction of a plurality of users with a plurality of items of products or services during a plurality of sessions;
    associating, by the at least one computing device, each respective item of the plurality of items as a respective word;
    associating, by the at least one computing device, strings of the words during respective sessions as sentences;
    determining, by the at least one computing device, a respective item vector representation for each respective item of the plurality of items by processing the sentences with a word embedding model;
    receiving, by the at least one computing device, data describing subsequent interaction with at least one of the plurality of items of products or services;
    generating, by the at least one computing device, at least one item recommendation by utilizing an item similarity matrix based on the item vector representations and the data describing the subsequent interaction; and
    outputting, by the at least one computing device, the at least one item recommendation.

2. The method as described in claim 1, wherein the method further comprises building, by the at least one computing device, the item similarity matrix based on the item vector representations.

3. The method as described in claim 2, wherein building the item similarity matrix comprises computing, by the at least one computing device, dot products between the item vector representations to determine item to item similarities.

4. The method as described in claim 1, wherein the word embedding model comprises a global log-bilinear regression model that is configured to use a word-word co-occurrence matrix along with local context window methods to generate word embeddings in a low dimensional space.

5. The method as described in claim 1, wherein the word embedding model utilizes a neural network that is trained to predict a central word given words that occur in a context window around the central word.

6. The method as described in claim 1, wherein multiple permutations of the words are inputted into the word embedding model.

7. The method as described in claim 1, wherein the subsequent interaction is with an item that was previously interacted with at a time that the recommendation is generated.

8. The method as described in claim 1, wherein the subsequent interaction is with a currently viewed item at a time that the recommendation is generated.

9. The method as described in claim 1, wherein each respective sentence corresponds with a single session of the plurality of sessions.

10. The method as described in claim 1, wherein each respective item vector representation comprises a word vector.

11. The method as described in claim 1, wherein the utilizing an item similarity matrix comprises determining an additional item of the plurality of items of products or services based on a similarity to the at least one of the plurality of items of products or services, and wherein the at least one item recommendation is associated with the additional item.

12. A method, implemented by at least one computing device, of receiving at least one recommended item of a product or service, the method comprising:
    sending, by the at least one computing device, data describing an interaction of a user with at least one item of a product or service;
    receiving, by the at least one computing device, the at least one recommended item based on the data, the at least one recommended item determined by an item similarity matrix based on item vector representations determined based on words and sentences associated with historical interactions by the user or other users with the at least one item and other items of products or services, the words corresponding to the at least one item and the other items and the sentences corresponding to strings of words corresponding to the at least one item and the other items interacted with during respective sessions; and
    outputting, by the at least one computing device, the at least one recommended item.

13. The method as described in claim 12, wherein the at least one recommended item is a plurality of recommended items and the method further comprises ranking the plurality of recommended items based upon explicit user ratings.

14. The method as described in claim 12, wherein the at least one recommended item is further determined by examining the item similarity matrix for the at least one item and the other items built using the item vector representations for the at least one item and the other items, the item vector representations determined by inputting the sentences into a word embedding model.

15. The method as described in claim 14, wherein the word embedding model comprises a global log-bilinear regression model that is configured to use a word-word co-occurrence matrix along with local context window methods to generate word embeddings in a low dimensional space.

16. The method as described in claim 14, wherein multiple permutations of the sentences are inputted into the word embedding model.

17. The method as described in claim 14, wherein the item similarity matrix may associate a plurality of historically interacted with items as being similar and a plurality of other historically interacted with items as being dissimilar.

18. A system comprising:
    at least one processor; and
    at least one module implemented at least partially in hardware, the at least one module operable to provide at least one item recommendation of a product or service by performing operations comprising:
        collecting data that describes interaction of a plurality of users with a plurality of items of products or services during a plurality of sessions;
        associating each respective item of the plurality of items as a respective word;
        associating strings of the words during respective sessions as sentences;
        determining a respective item vector representation for each respective item of the plurality of items by processing the sentences with a word embedding model;
        receiving data describing subsequent interaction with at least one of the plurality of items of products or services;
        generating at least one item recommendation by utilizing an item similarity matrix based on the item vector representations and the data describing the subsequent interaction; and
        outputting the at least one item recommendation.

19. The system as described in claim 18, the operations further comprising building the item similarity matrix by computing dot products between the item vector representations to determine item to item similarities.

20. The system as described in claim 18, wherein the subsequent interaction is with an item that was previously interacted with at a time that the recommendation is generated.

* * * * *